United States Patent [19]
Gudmundsen et al.

[11] 3,790,898
[45] Feb. 5, 1974

[54] SELECTIVELY TUNABLE GASEOUS LASER

[75] Inventors: Richard A. Gudmundsen, Santa Ana; James E. Rau, Anaheim, both of Calif.

[73] Assignee: North American Rockwell Corporation, El Segundo, Calif.

[22] Filed: July 12, 1971

[21] Appl. No.: 161,583

Related U.S. Application Data

[63] Continuation-in-part of Ser. No. 837,249, June 27, 1969, Pat. No. 3,624,551.

[52] U.S. Cl. ............... 331/94.5, 350/161, 250/199, 356/106
[51] Int. Cl. .......................... H01s 3/08, H01s 3/10
[58] Field of Search ...... 331/94.5; 250/199; 350/16; 356/106

[56] References Cited
UNITED STATES PATENTS

| | | | |
|---|---|---|---|
| 3,443,243 | 5/1969 | Patel | 331/94.5 |
| 3,435,370 | 3/1969 | Harris et al. | 331/94.5 |
| 3,624,551 | 11/1971 | Gudmundsen et al. | 331/94.5 |
| 3,627,422 | 12/1971 | Chodorow | 356/106 |

Primary Examiner—Ronald L. Wibert
Assistant Examiner—R. J. Webster
Attorney, Agent, or Firm—L. Lee Humphries; H. Frederick Hamann

[57] ABSTRACT

The invention relates to a laser device which comprises in combination laser generation means including a laser cavity which has a gaseous medium in at least a portion of the cavity and which produces directed energy comprised of a group of frequency bands. Also included are apparatuses which react with the directed energy, so designed so as to avoid translation and angular rotation of the directed energy. The apparatuses provide selective tuning of the laser cavity to at least one of the frequency bands. Included are equipments for programming the apparatuses so that the laser is tuned to either one of the frequency bands, to all of the frequency bands in a predetermined sequence, or to some of the frequency bands in a random access manner. An additional component interposed in the path of the directed energy beam enables the laser beam to act as a carrier of the electrical signals provided by this additional component.

12 Claims, 11 Drawing Figures

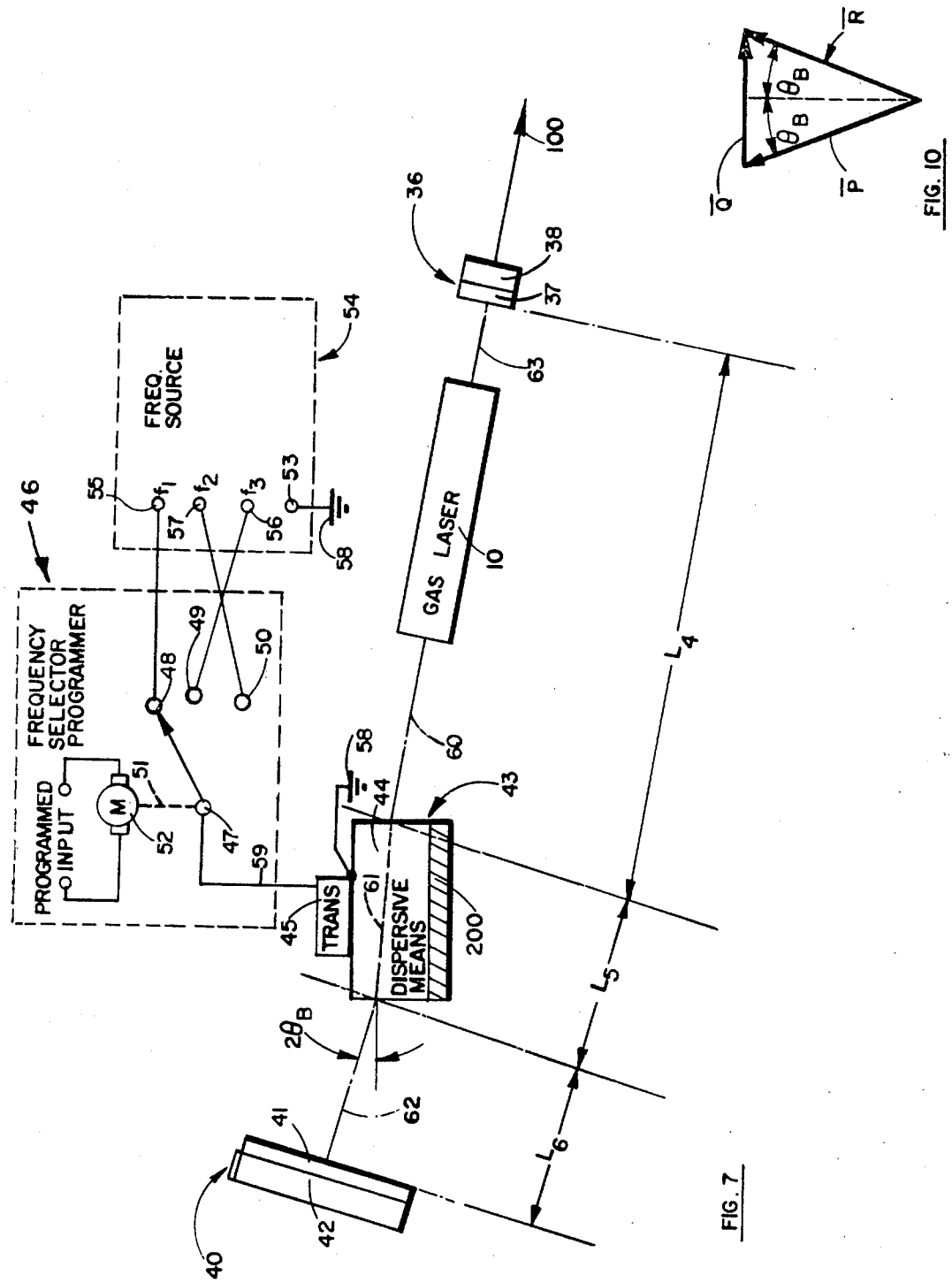

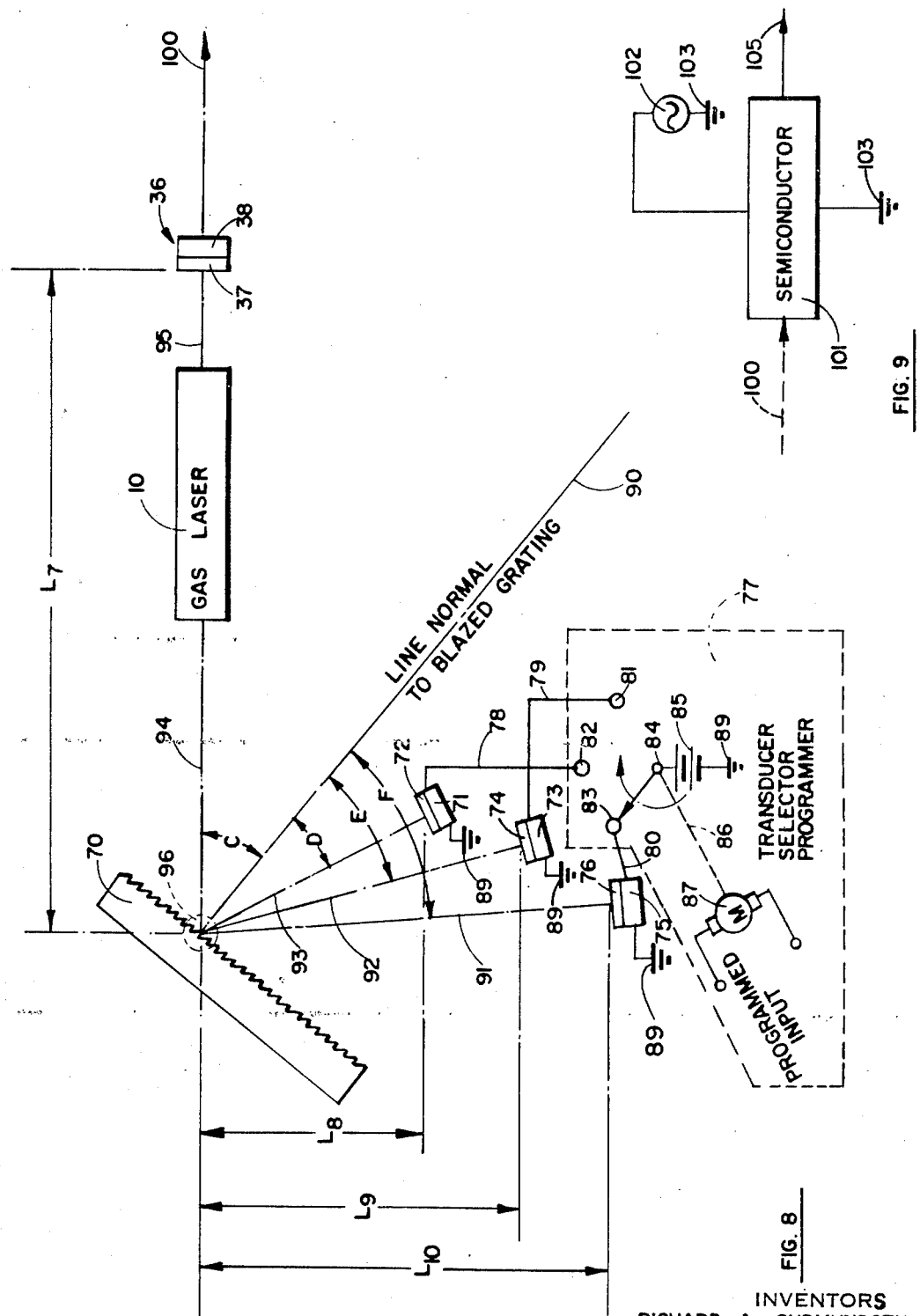

SELECTIVELY TUNABLE GASEOUS LASER

COPENDING PARENT APPLICATION

This is a continuation-in-part of application Ser. No. 837,249, filed June 27, 1969, copending with this application, and now U.S. Pat. No. 3,624,551.

BACKGROUND OF THE INVENTION

Laser generation devices having means for tuning the laser cavity which produce directed energy of a laser beam generally cause angular rotation or translation of the laser beam while the devices are being tuned.

Further disadvantages of laser beam producing devices are that they generally produce a single frequency band and hence do not lend themselves to selective tuning to a group of frequency bands, one band at-a-time, sequentially or in a random-access fashion.

Further in the conventional laser generation device means for superimposing signals on the directed energy is not readily possible without translation or angular rotation of the beam.

SUMMARY OF THE INVENTION

Quantum Theory of Molecular Transitions of a Carbon Dioxide Laser Medium

Inasmuch as this invention uses a gas laser medium, discussion of the characteristic behavior of this medium in a laser device is appropriate. Reference is made to FIGS. 1, 2 and 3, wherein FIG. 1 displays the intensity of the $C_{12}O_{16}O_{16}$ isotope as a function of time of the carbon dioxide molecule which is used as a laser medium, and FIGS. 2 and 3, the spectral amplitude of this molecule is shown as a function of the number of waves per centimeter or frequency This $C_{12}O_{16}O_{16}$ carbon dioxide isotope is exemplary of the various isotopes usable as a gas laser medium. Examples of other isotopes of carbon dioxide which are usable as a laser medium are $C_{12}O_{16}O_{18}$, $C_{12}O_{17}O_{18}$, $C_{12}O_{17}O_{18}$ as well as other permutations and combinations of carbon and oxygen. The carbon monoxide isotope is also exemplary of the various isotopes usable as a gas laser medium. Examples of carbon monoxide isotopes are $C_{12}O_{16}$, $C_{12}O_{17}$ and $C_{12}O_{18}$ and a number of other combinations of carbon and oxygen. Other gaseous laser media may also be used.

Although the character of the spectral intensity versus time and the spectral amplitude versus frequency of the $C_{12}O_{16}O_{16}$ isotope will be discussed hereinbelow, is understood that frequency limits and wavelength spread of other isotopes may be greater as smaller than the $C_{12}O_{16}O_{16}$ isotope and may have a different frequency and wavelength spread; these other isotopes may also be used.

Hence, it is seen from FIGS. 2 and 3 that the $C_{12}O_{16}O_{16}$ isotope will have a wavelength and frequency spectral distribution, the upper and lower plot point limits being as follows:

| wave number in waves per cm | frequency $\times 10^{12}$ cycles per sec. | wavelength in microns |
| --- | --- | --- |
| 1087 | 32.7 | 9.2 |
| 926 | 27.8 | 10.8 |

Upon further examining the characteristics of FIG. 1, it can be seen that this figure represents the 001–02° O and the 001–100 transition states of the exemplary $C_{12}O_{16}O_{16}$ carbon dioxide isotope under discussion. The transition from the quantum state 001–02° O to the quantum state 001–100 is the reason for the creation of R and P groups of absorption lines, shown as 75 lines in FIG. 1. Each of the lines of the time function response characteristic of FIG. 1 corresponds to a frequency band of the frequency or wave number function response characteristics of FIGS. 2 and 3. The frequency function response characteristics of the 001–100 transition is displayed in FIG. 2, while the 001–02° O transition is displayed in FIG. 3. Each line of FIG. 1 or its corresponding frequency band or wave number of FIGS. 2 and 3 has a band width of approximately 100 megacycles. It follows, that other isotopes of gaseous laser media will exhibit larger or smaller band width characteristics and a larger or smaller group of spectral lines and frequency bands, dependent upon the isotope.

Hence, the natural characteristics of gaseous laser media, and particularly such media having isotopes comprised of the carbon and oxygen elements give rise to a wide group of frequency bands, each band having a relatively wide band width in the transition process from one quantum state to another.

These characteristics make available a large number of frequency bands as an output from any laser device employing these isotopes. Tuning the laser device to any of the frequency bands generated, or sequentially tuning the laser device to any of the frequency bands generated or to randomly tune to these frequency bands constitute a number of options made possible by use of a gas type laser medium of the oxygen-carbon molecule. Further possibilities exist for superimposing signals on the beam of directed laser energy by a modulator located in the path of and responsive to the directed laser beam.

The wavelength, frequency and wave number used in FIGS. 2 and 3 are given by the following relationships:

$$\lambda = c/f \quad (1),$$

$$w = 1/\lambda \quad (2),$$

where $c$ = velocity of light = $3 \times 10^{10}$ cm/sec., $f$ = frequency in cycles per second, $\lambda$ = wavelength in microns, where 1 micron = $10^{-4}$ cm., $w$ = wave number in waves/cm Further details relative to energy transition levels of gaseous laser media may be found in any good textbook on quantum mechanics.

SUMMARY

Briefly, in accordance with the invention, four different species of a directed laser beam generating device is shown in FIGS. 4–8, all having a gaseous laser medium for producing directed laser energy discharge, and means reacting with the directed energy for avoiding translation and angular rotation of the directed energy. The reacting means provides selective tuning of a laser cavity of each of the species to at least one of the frequency bands. The laser device comprises means which include the laser cavity wherein the gaseous medium is in at least a portion of laser cavity. The laser cavity, therefore, in combination with the reacting means, provides the directed laser energy and tuning capability of the laser device. The gas laser medium may be contained optionally in a laser chamber which may occupy in length anywhere from a very small portion of the laser cavity to nearly the entire laser cavity.

OBJECTIVES OF THE INVENTION

Hence, it is an objective of this invention to provide a laser device producing directed energy wherein the beam of directed energy produced will not be subject to angular rotation or to translation when being tuned.

It is a further objective of this invention to provide such a laser device capable of being selectively tuned to any of a group of frequency bands constituting the directed energy beam.

It is still a further objective of this invention to provide species of this device for enabling such selective tuning to be accomplished sequentially, in a random fashion or to provide discrete tuning constantly to one of the frequency bands.

It is yet another objective of this invention to provide means for superimposing signals on the directed energy by utilizing modulation devices or similar means in the path of the directed energy.

BRIEF DESCRIPTION OF THE DRAWINGS

FIG. 7 is a schematic view of a third exemplary embodiment of a laser device showing a gas laser chamber, a partially reflective means, a semiconductor attached to an electrically excited transducer and a reflective surface for providing selective tuning to any of a group of frequency bands produced by this laser device;

FIG. 8 is a schematic view of a fourth exemplary embodiment of a laser device showing a gas laser chamber, a partially reflective portion, an energy dispersive portion and a group of programmable electrically activated transducers having mirrored surfaces for providing tuning to any of the frequency bands of the laser device according to the particular transducer being activated;

FIG. 9 is a schematic representation of a device generating electrical signals connected to semiconductive material, wherein the semiconductive material may be interposed in the path of the directed energy in connection with any of the four species of laser devices of FIGS. 4, 6, 7 or 8, for enabling the electrical signals to be carried by the directed laser beam of energy transmitted by any of these laser devices;

FIG. 10 is a vector relationship diagram as related to the configuration of FIG. 7.

EXEMPLARY EMBODIMENTS

The First Exemplary Embodiment

Figure 4:
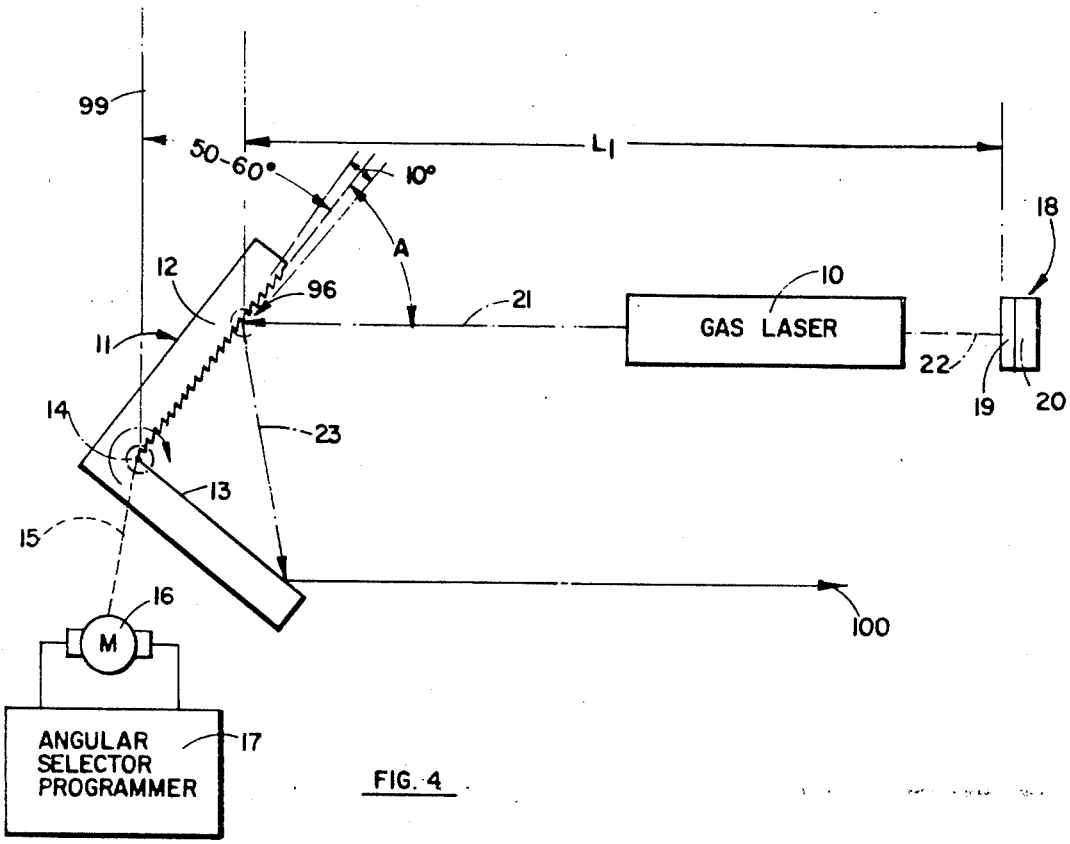
FIG. 4 is a schematic view of a first exemplary embodiment of a laser device showing a gas laser chamber, reflective means consisting of dispersive and reflective portions which react with the directed laser energy and which is rotatable to produce selective tuning to any of a group of frequency bands provided by the laser device.

Referring to FIG. 4, laser chamber 10 contains $C_{12}O_{16}O_{16}$ isotope of carbon dioxide and conventional laser pumping means (not shown). Reacting means 11 comprises a rotatable energy dispersive or blazed grating portion 12, and reflective portion 13 substantially at right angles with respect to dispersive portion 12.

The reacting means is rotatable about pivot point 14 by means of shaft 15 of a prime mover or motor 16, shaft 15 being attached to pivot point 14. Motor 16 is electrically energized through angular selector programmer 17 which is adapted to the prime mover for positioning the reacting means so as to provide different angular orientations of the surface of the dispersive portion 12 with respect to a laser beam directed on to that surface. Programmer 17 may provide the means by which the reacting means is continuously rotated, or may in a predetermined sequence change the angular position of the reacting means 11 and hence the dispersive portion 12 so that the directed laser beam 21 forms angle A with an imaginary plane parallel to the face of the dispersive portion 12. Angle A will vary between 30 and 40 degrees over the range where the several frequency bands will be produced by beam portion 21. Hence an approximate band ± 5° about the imaginary plane or a 10° band bisected by the imaginary plane will represent the limits over which the face of dispersive portion 12 would have to be positioned to produce the frequency bands hereinabove described in connection with FIGS. 2 and 3. Outside of the ± 5° variation, the laser device will not resonate to any of the frequency bands.

Mirror 18 comprising reflective portion 19 and opaque portion 20 is positioned for reflecting portion 22 of the laser beam. Selective tuning of the laser device so as to cause resonance at any of the frequency bands hereinabove stated, will be accomplished by rotational action of the programmed reacting means. The laser beam consisting of portions 21, 22, and that portion of the laser beam within chamber 10 will be reflected back and forth at resonance over an effective electrical length $L_1$ of the laser cavity, producing standing waves. It follows therefore, that the laser cavity will include such components as the dispersive portion 12, gas laser gain chamber 10 and mirror 18, and that resonance of the laser cavity at any one of the frequency bands will be a function of angle A.

Portion 23 of the laser beam, which constitutes approximately 30 percent of the directed energy is diffracted by the dispersive portion 12, directed to the mirrored surface of reflective portion 13, reflected therefrom and transmitted as laser beam portion 100 comprising any of the hereinabove stated frequency bands. Beam portion 100 will be maintained parallel to beam portions 21 and 22 throughout the range of the ± 5° variations; during these variations selective tuning of the laser device is possible. It is also noted that beam portion 100 will not be angularly rotated or translated during the entire range of the ± 5° variations, thereby making it possible to direct the laser beam accurately on to a given target without the necessity of employing complex beam redirection devices. It is noted that when angle A is varied over the approximate range of 40–50°, the rotatable reacting means 11 will be positioned at an angle described by a vertical line 99 and the imaginary plane at the face of blazed grating portion 12, the angle ranging between 50° and 60°, approximately.

It may be seen from the above description of this embodiment, that programmer 17 used herein may be adapted or programmed to provide a specific angular orientation of reacting means 11 so that the angle between line 99 and the face of the blazed grating portion 12 is within the specified limits to produce one of the discrete frequency bands, the frequency bands scanned in sequential order, or the frequency bands chosen in a random access manner or in a given predetermined and programmed order to provide directed laser energy at a plurality of frequencies capable of being produced by the device without translation or angular rotation of the directed energy.

Figure 5:
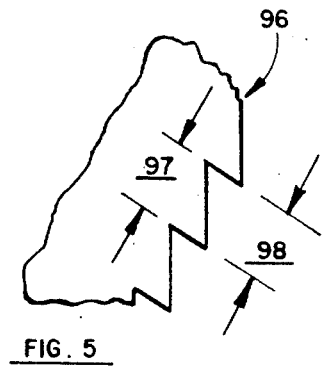
FIG. 5 is a magnification of a portion of the dispersive portion used in the first and fourth exemplary embodiments showing the blaze angle of a very small area of the dispersive means.

Referring to FIG. 5, a very much enlarged view is shown at 96 of the blazed grating portion 12 of the reacting means. Therein it is seen that the face of the blazed grating constitutes a plurality of generally right angle triangular members wherein the length of the slanted or hypotenuse-shaped portion 98 is longer than the length of the longer side 97 of the other two remaining sides. The blaze angle is defined as the angle formed by sides 97 and 98. The blazed grating provides diffraction action of the directed energy so that a portion of the diffracted directed energy is directed to the reflective surface of reflective portion 13 for reflection therefrom as beam 100. Stationary blazed grating 70, as used in connection with the embodiment of FIG. 8 is identical to blazed grating 12.

THE SECOND EXEMPLARY EMBODIMENT

Figure 1:
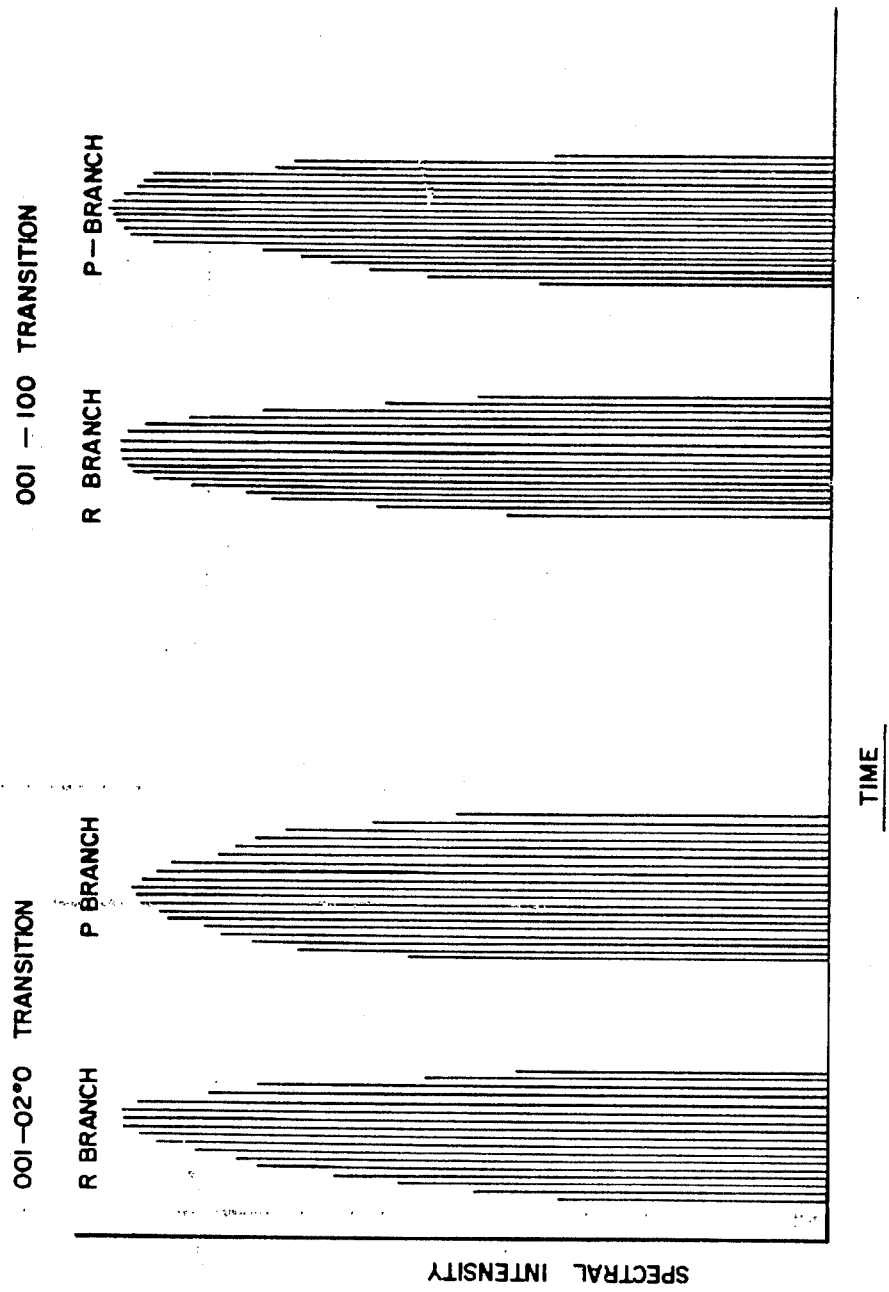
FIG. 1 is a spectral intensity diagram of the transition of the $C_{12}O_{16}O_{16}$ isotope of carbon dioxide from the 001–02° O to the 001–100 level as a function of time and showing the 75 spectral lines comprising the R and P branches of these transition levels.
Figure 2:
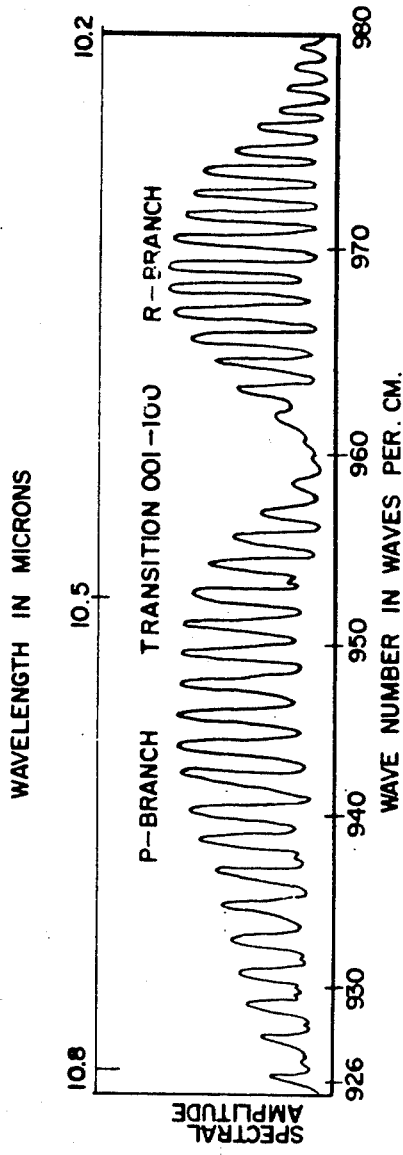
FIG. 2 is a spectral amplitude diagram of the $C_{12}O_{16}O_{16}$ isotope of carbon dioxide 001–100 energy level as a function of waves per centimeter or frequency bands comprising the R and P branches thereof and having a wavelength spread between 10.2 and 10.8 microns.
Figure 3:
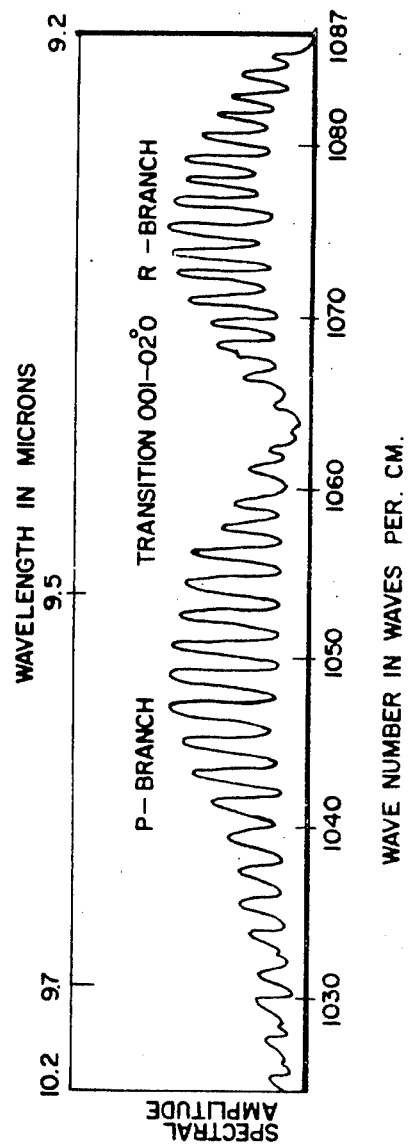
FIG. 3 is a spectral amplitude diagram of the $C_{12}O_{16}O_{16}$ isotope of carbon dioxide 001–02° O energy level as a function of waves per centimeter or frequency bands comprising the R and P branches thereof and having a wavelength spread between 9.2 and 10.2 microns.
Figure 6:
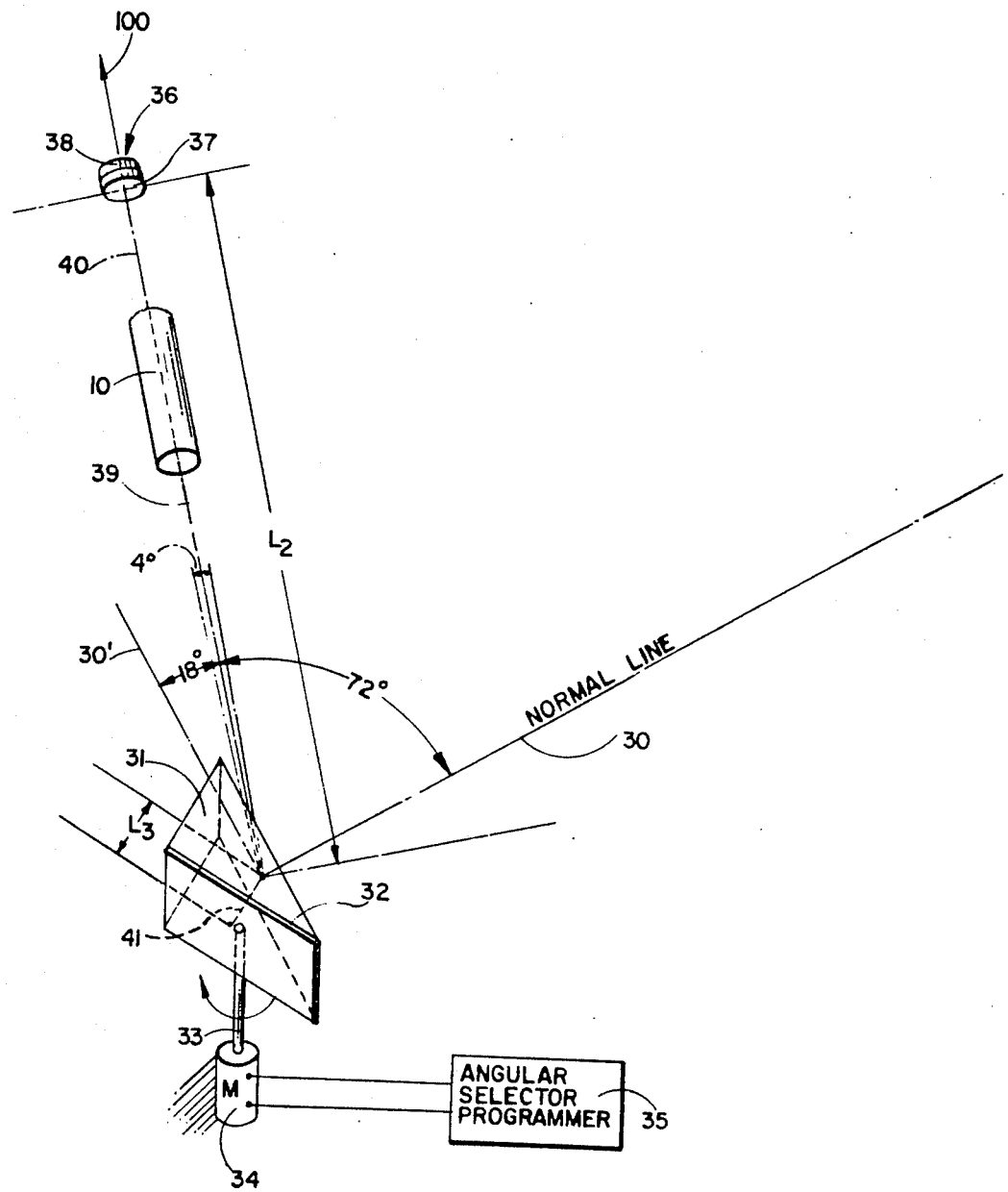
FIG. 6 is a schematic view mostly in perspective, of a second exemplary embodiment of a laser device showing a gas laser chamber, a partially reflective portion, a rotatable prism for reacting with the directed laser energy to provide selective tuning to any of a group of frequency bands provided by this laser device.

Referring to FIG. 6, laser chamber 10 contains $C_{12}O_{16}O_{16}$ isotope of carbon dioxide and conventional laser pumping means (not shown). The reacting means comprises a rotatable right angle prism 31 with a reflective coating 32 generally of gold or silver on the longer side of the two remaining sides of the prism. The prism (of index of refraction n, which is a function of frequency) is rotated as shown by the rotational direction arrow. Rotational action is accomplished by attaching the prism to shaft 33 of motor 34. Motor 34 is electrically connected to angular selector programmer 35, and the programmer controls the angular position of the motor for positioning the prism so as to provide angular orientation thereof with respect to the directed laser beam as desired, or to provide continuous rotation of prism 31. The reacting means or reflective prism 31 provides optical interaction with at least a portion of directed energy 41 which is transmitted within prism 31 and reflected by surface 32. The directed laser beam is comprised of portions 39, 40, 41, and that portion internal to chamber 10. When portion 39 is impinged upon the longest surface of prism 31 and transmitted into the prism as portion 41 frequency bands as hereinabove described in connection with FIGS. 2 and 3 are produced when the longest surface of the prism is oriented at a moninal 72° with respect to normal line 30. At that point of orientation, the prism forms an angle of 18° with respect to line 30', which is parallel to the longest surface of the prism and is perpendicular to the directed beam portion 39. The frequency bands transmitted will occur over an approximate range of ± 2° angular prism orientation with respect to the nominal 18° angle when the prism material is comprised of gallium arsenide. When other prism materials are used, angular orientations ranging between ±1° and ±5° are possible.

It is seen that during resonance, the effective electrical length of the laser cavity is $L_2 + L_3$. Resonance or tuning of the laser device will occur in the laser cavity between mirror surface 37 of partial mirror 36 and reflective surface 32 of prism 31 over the effective cavity length $L_2 + L_3$. Partial mirror 36 is comprised of mirror surface 37 having a chemical backing 38. Backing 38 may be either germanium or sodium chloride or other suitable material. Partial mirror 36 will have approximately an 80 percent reflective and a 20 percent transmittive quality. Due to the characteristics of the prism, a portion of the directed beam, beam 100, will be transmitted during the aforesaid prism positions about the nominal 18° angle, through the partial mirror without translation or angular rotation of beam 100.

It is understood that programmer 35 may be a high speed electronic device for providing discrete positioning of the prism, sequential rotation thereof or a predetermined order of angular positioning of the prism for providing the various frequency bands hereinafter described in connection with FIGS. 2 and 3.

THE THIRD EXEMPLARY EMBODIMENT

Referring to FIGS. 7 and 10, laser chamber 10 which contains the $C_{12}O_{16}O_{16}$ isotope of carbon dioxide, also has a conventional laser pumping means (not shown) for producing internal laser power gain through the production of an inverted energy state population, as is well known in the art.

Spaced apart and positioned in front of chamber 10 at one end of the laser cavity is partial mirror 36. This mirror is comprised of partially reflective surface 37, and a chemical backing 38 such as germinium or sodium chloride. Mirror 36, therefore, has the capability of transmitting 20% of the laser beam and reflecting 80% thereof.

Reflecting means 40 is comprised of mirror 41 having attached thereto an opaque backing 42, and is positioned at the other end of the laser cavity.

Reacting means 43 is comprised of a dispersive means 44, such as semiconductive material, coupled to electrically responsive transducer means 45, such as an acoustic transducer, by attaching the transducer means 45 to the dispersive means 44. Dispersive means 44, being interposed in the path of the directed energy within the laser cavity, provides selective tuning of the laser cavity in accordance with frequencies of electric signals energizing the transducer means. To accomplish this selective tuning, transducer means 45 is electrically connected at one end thereof to ground 58, the other end of the transducer being connected by means of wire 59 to a rotatably driven member 47 of a selector switch located in a frequency selector programmer 46. The ground return side 53 of frequency source 54 is connected to ground and common signal return 58. Member 47 is attached to shaft 51 of motor 52. Motor 52 is controlled and positioned by the programmer in accordance with a predetermined program. Exemplary of the order in which different frequencies might be impressed across transducer 45 is depicted in the way the selector switch is connected to a frequency source. When terminals 48, 49 and 50 of the frequency selector programmer are respectively electrically connected to terminals 55, 56 and 57 of frequency source 54, electrical signals having frequencies symbolically stated as $f_1$, $f_3$ and $f_2$ are sequentially imposed across transducer 45. When motor 52 is programmed to be driven constantly by the programmer, the signals having frequencies $f_1$, $f_3$ and $f_2$, in that order, are representative of any three low frequency signals which will be impressed across transducer 45. The laser cavity will then be tuned to three of the particular frequency bands as hereinabove discussed in connection with FIGS. 2 and 3. It may be seen from the interconnections between the programmer and frequency source that the order of the frequencies exciting transducer 45 may be accomplished by the manner in which the selector switch terminals are connected to the frequency source terminals.

Consequently, if a single one of the frequency bands is desired for example, the programmer causes the selector switch to stop at a particular terminal thereof, thereby constantly interconnecting rotatable member 47 with any of terminals 48, 49 or 50 of this exemplary selector switch. In this instance, the laser is at resonance to one of the frequency bands determined by the particular frequency used to excite transducer 45, and a laser beam comprised of portion 60, portion 61 which is bent slightly by propagation through dispersive means 44, portion 62, and portion 63 will be directed through partial mirror 36, as directed energy 100. Frequency source 54 may be connected to programmer 46 so that the electrical signals across transducer 45 may be switched in an ascending or decending frequency order of the frequencies supplied by source 54. In this instance, the frequency bands produced by the laser device will be propagated in a sequential order.

Although only several frequencies were shown as being produced by source 54, it is understood that as many frequencies as required may be provided thereby. It is also understood that high speed electronic programmers may be used instead of the electromechanical programmer illustrated.

The effective electrical length of the laser cavity of this configuration will be comprised of $L_4$, $L_5$ and $L_6$. The principle of standing waves and resonance will be the same as discussed hereinabove in connection with the first exemplary embodiment. The transducer means 45 used in this embodiment is composed generally of piezo-electrical material.

Dispersive means 44 acts as an optical beam deflector. The dispersive means 44 can be a solid, a semiconductor such as germanium, (or liquid) in which a relatively high intensity running acoustic wave is propagated through the dispersive means 44 and absorbed by acoustic absorber 200, generally a block of lead. The compression and rarification waves in the dispersive medium or means 44 introduce a small perturbation on the local index of refraction for light (optical) waves. Reflection of the photons occur as a result, if certain rules are observed.

In order to explain the quantum-mechanical interaction which produces what is known as "Bragg Acoustic Reflection", reference is made to FIG. 10, wherein the vector relationships of $\overline{P}$, $\overline{Q}$ and $\overline{R}$, and twice the Bragg angle between $\overline{P}$ and $\overline{R}$, are shown. In FIG. 10, $$\overline{P} = nh\,\nu_o/c,\ \overline{Q} = h\,\nu_a\nu,\ \overline{R} = nh(\nu_o + \nu_a/c,$$

where, $\nu_a \ll \nu_o$ $\theta_B = \sin^{-1} \lambda_{o/n}/\lambda_a$
$\theta_B =$ the Bragg Angle
$\lambda_o =$ the optical wavelength
$\lambda_a =$ the acoustic wavelength
$v =$ the velocity of sound in the dispersive media, in germanium it is approximately $7.5 \times 10^4$ cm/sec.
$n =$ is the index of refraction, in germanium it is typically 4.
$c =$ velocity of light in a vacuum which is $3 \times 10^{10}$ cm/sec.
$h =$ Plank's constant which is $6.6 \times 10^{-34}$ joule -sec.
$\nu_a =$ acoustic frequency in cycles (hertz)
$\nu_o =$ optical frequency in cycles (hertz) at the input.

These vectors represent the momentum of the incoming photon of frequency $\nu_o$, the incoming phonon from the acoustic beam of frequency $\nu_a$ and the momentum of the photon after being scattered by the phonon. As long as $\nu_o \gg \nu_a$ the quantity $nh(\nu_o + \nu_a)/c$ can be essentially replaced by $nh\,\nu_o/c$, i.e., the lengths of the two photon momentum vectors are essentially the same. In this case, the resonant scattering angle $\theta_B$, called the "Bragg" Angle, is approximated as $h\,\nu_a/v/nh\nu_o/c = \lambda_{o/n}/\lambda_a$. Here we define $\lambda_{o/n}$ as the optical wavelength in the medium, $\nu_a$ as the acoustic (phonon) frequency, v is the velocity of sound in the medium, and $\lambda_a$ as the acoustic wavelength in the dispersive medium.

It is an experimental fact that as the angle $\theta$ between an acoustic beam and a photon beam, is varied, that the strength of the scattered beam will go through a sharp maximum as $\theta$ equals the Bragg angle $\theta_B$.

It is noted that $\theta_B$ is the ratio between the optical wavelength in the dispersive medium or means 44, and the acoustic wavelength. In this specific application of the Bragg reflection principle, it is desired to maintain $\theta_B$ constant so that the mirror 41 in FIG. 7 may be maintained at a constant position, while at the same time varying the resonant frequency of the optical cavity employed in the laser system. This is accomplished simply by electrically selecting the proper frequency to drive the acoustic transducer 45, by means of the programming selector provided therefor, to select the proper frequency from frequency source 54. Whenever the optical cavity resonance frequency corresponds to a frequency region where the laser means 10 has optical gain, then the laser system will operate to deliver output power.

Figure 11:
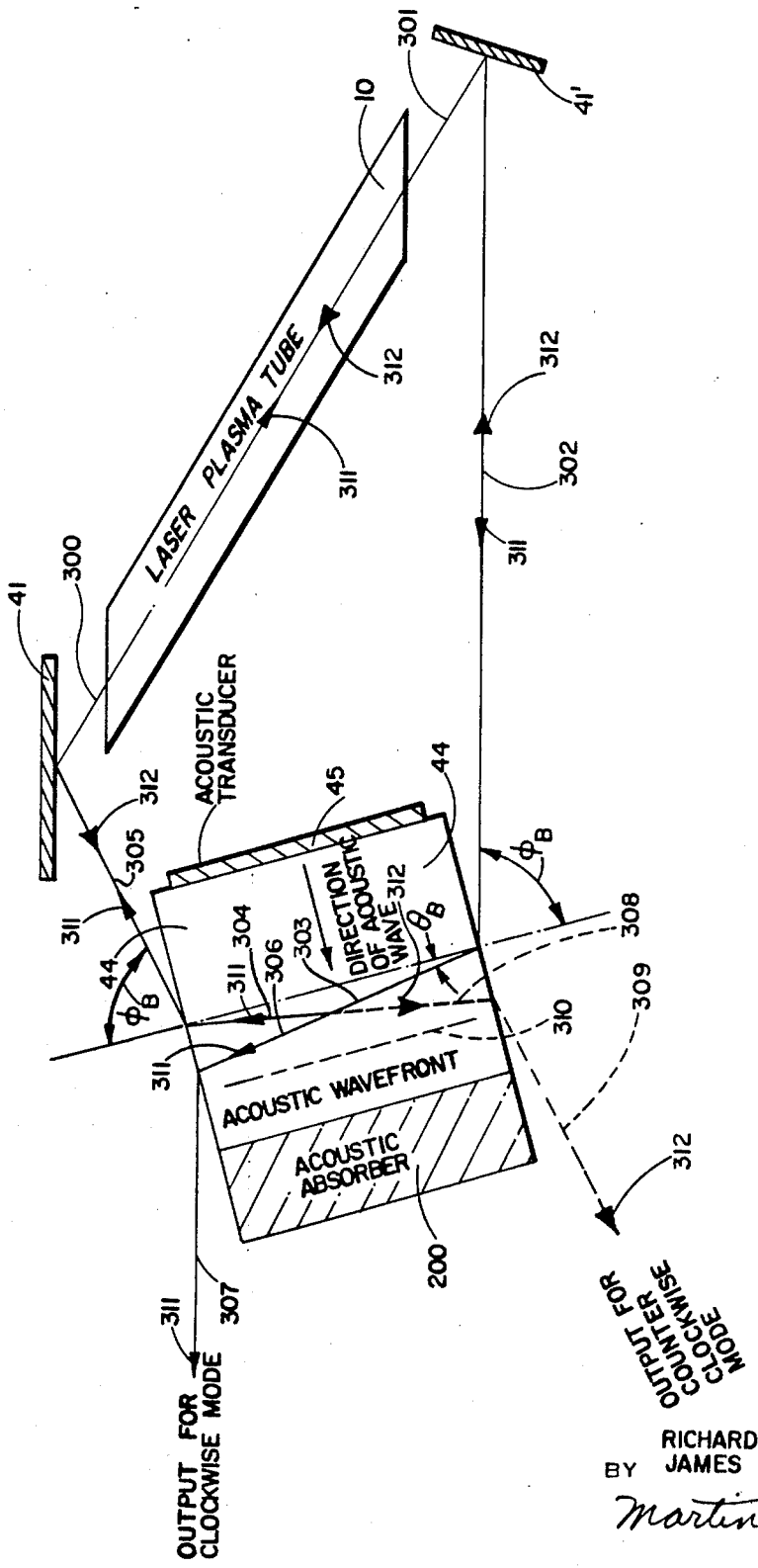
FIG. 11 is a schematic diagram of an alternate exemplary version of the same operating principles involved in FIG. 7 except that two modes of oscillation are thereby made possible.

Referring to FIG. 11, the acoustic dispersive device is placed in a "ring laser" configuration which makes use of Brewster Angle inputs and outputs $\phi_B$ with respect to the dispersive device, to minimize reflection losses.

In the case of a ring-laser, there are two distinct directions of rotation of the wave corresponding to a mode in the resonant cavity, which may or may not have the same frequency. For example, it is well known in the art that if such a unit is rotated about a line perpendicular to the plane of the paper in FIG. 11, that the difference in frequency between the clockwise mode and the counter-clockwise mode will be proportional to the rotation rate. This is, of course, the principle of the laser gyro.

For gas laser systems in which the gain mechanism in means 10 of FIG. 11 is "homogeneous", i.e., where the shape of the gain curve is given by a Lorentzian function, then the theorem of Van der Pol explains that only one "mode" in the oscillating system will oscillate at a time.

In this particular case, either the clockwise mode, indicated by the long arrow heads labeled 311 corresponding to the output beam 307, or the counter clockwise mode, indicated by the squat arrow heads labeled 312 corresponding to output beam 309, will run at one time. In typical applications, means (not shown) are frequently used to enhance one direction over the other. The clockwise mode may be described in terms of oscillation path 300-301-302-303-304-305, and by output path 302-306-307. The counter clockwise mode may be described in terms of oscillation path 300-305-304-303-302-301, and by output path 305-308-309 of the laser system.

In the case of this application, this principle is particularly useful because means 44 can be employed not only as the frequency discrimination means as implied in connection with FIG. 10, but also as the "output coupler," corresponding to the action of means 36 of FIG. 7, as well.

The reason this is true is that in any real case, not all of the photons entering the acoustic dispersive device (means 44 of FIGS. 7 and 11) are scattered through the angle $2\theta_B$, twice the Bragg Angle as shown in FIG. 7. Indeed a significant fraction simply passes straight through as indicated by ray 306 of FIG. 11 for a clockwise oscillating mode, or by ray 308 FIG. 11 for a counter clockwise oscillating mode. This "unscattered" portion of the beam thus becomes the "output" of the laser device shown in FIG. 11, while it is a simple loss term for the configuration represented by FIGS. 7 and 10.

Briefly, then FIGS. 7 and 11 are similar, with respect to all members thereof being stationary, and in the employment of acoustic means for dispersion of the laser beam therethrough. In both configurations, the acoustic wave transduced by transducer 45 and propagating through the dispersive medium 44 encounters an acoustic wavefront due to the concentration band created by acoustical action. Absorber 200 provides a sink for the acoustic wave to prevent same from exiting the system. In both instances, laser plasma tube 10 is used to create the laser energy. In both instances the output laser beam(s) exit(s) without rotation and without displacement. Both have the same controls (programming and frequency source), although these are not shown in FIG. 11. The differences in the two configurations are, in that in FIG. 7 there is a single mode of oscillation (although these may be a multitude of selectable oscillation frequencies) and the output beam exits through the partial mirror 36, whereas in the FIG. 11 configuration there are two modes of oscillation and the beams thereof exit through the dispersive means 44.

THE FOURTH EXEMPLARY EMBODIMENT

Referring to FIG. 8, laser chamber 10 which contains the $C_{12}O_{16}O_{16}$ isotope of carbon dioxide also has a conventional laser pumping means (not shown). Reacting means 70, which is identical to blazed grating 12 as hereinabove discussed in connection with the first exemplary embodiment, is interposed in the path of the directed laser energy emanating from chamber 10 and positioned near one end of chamber 10. A partial mirror 36 identical in form and composition as used in connection with the second exemplary embodiment hereinabove described is positioned near the other end of laser chamber 10. When the laser device is at resonance to any of the frequency bands described in connection with FIGS. 2 or 3, the laser beam resonates within the laser cavity of this configuration. Laser beam portions 94 and 95 external to laser chamber 10 are within this cavity. Laser beam portion 94 forms an angle C with respect to a line 90 which is an imaginary line normal to blazed grating 70. As a result of beam 94 impinging upon blazed grating 70, diffraction of beam 94 occurs which may result in any of diffracted beams 91, 92 and 93. Piezo-electric transducer 71, which has a mirrored surface 72, piezo-electric transducer 73 which has a mirrored surface 74 and piezoelectric transducer 75 which has a mirrored surface 76 are placed at different predetermined distances from the point of diffraction of the laser beam on the blazed grating. These tranducers are connected at one end to electrical ground return 89, the other ends thereof are respectively connected by means of wires 78, 79 and 80 to terminals 82, 81 and 83 of a driven switch within transducer selector programmer 77. Rotatable member 84 of the driven switch is electrically connected to battery 85, the return side of battery 85 being electrically connected to ground 89. Rotatable member 84 is mechanically coupled to shaft 86 of motor 87. Motor 87 input terminals are programmed by programmer 77 to provide switching to a specific transducer, to provide sequential switching of transducers 71, 73 and 75, or to provide random access switching or predetermined order switching of these transducers. Switching of any of these transducers imposes the electrical voltage of battery 85 across the particular transducer being switched, and translates the transducer a predetermined distance in space so that resonance is obtained at a particular frequency band hereinabove described in connection with FIGS. 2 and 3 so that a standing wave of laser energy in the laser cavity is obtained at the particular frequency band or at the several frequency bands in programmed order as the transducers are being switched.

Hence, it can be seen that when transducer 71 is electrically activated, the diffracted laser beam portion 93 will impinge upon mirror 72 and will be reflected therefrom at angle D with respect to normal line 90, and the effective electrical length of the laser cavity will be $L_7 + L_8$. When transducer 73 is electrically activated, the diffracted laser beam portion 92 of the directed laser beam will impinge upon mirror surface 74 and be reflected therefrom at angle E with respect to normal line 90, and the effective electrical length of the laser cavity will be $L_7 + L_9$. When transducer 75 is electrically activated, the diffracted laser beam portion 91 of the directed laser beam will impinge upon mirror surface 76 and be reflected therefrom at angle F with respect to normal line 90, and the effective electrical length of the laser cavity will be $L_7 + L_{10}$.

When the laser device is tuned or resonated to any of the frequency bands described in connection with FIGS. 2 or 3, directed energy beam portion 100 transmitted through partial mirror 36 will be directed outward from the laser device without angular orientation or translation of the laser beam.

It may be seen from the above description of this embodiment, that programmer 77 used herein may be adapted to provide electrical activation of the transducers in a predetermined order, activate only one transducer, or activate the transducers in sequence to provide the resonance to the various frequencies capable of being produced by a carbon dioxide laser device as hereinabove described. It is understood that although only three transducer elements where shown in the drawing, that 75 transducers, one for each frequency band, may be used when the carbon dioxide isotope laser produces 75 different frequency bands. It is also understood that although a simple switching mechanism was shown, that a high speed electronic switch within a high speed electronic programmer may be used for extremely rapid switching of the several transducers utilized. The transducers used herein are generally of piezo-electric material.

LASER DEVICES UTILIZED AS A SIGNAL CARRIER

Referring now to FIG. 9, a device or semiconductor means 101 may be provided in connection with any of the four species of laser devices hereinabove described to enable any of these laser devices to act as the carrier of electrical signals.

Adaptation of device 101, generally of semiconductive material, to these laser devices is accomplished by placing device 101 in the path of laser beam 100. Semiconductor device 101 is electrically connected to one side of an electrical signal source 102. The other side of semi-conductor 101 and the other side of electrical signal source 102 is connected to ground 103. Interposition of semiconductor 101 in the path of laser beam 100 causes that laser beam to penetrate through the semi-conductive material thereof and exit as directed laser beam component 105. It is, therefore, seen that any of the laser devices hereinabove described which may be tuned to one of the frequency bands, sequentially tuned to all of the frequency bands or tuned in a random access manner to some of the frequency bands as controlled by a particular programmer being used, may be used as carriers of electrical intelligence contained in source 102. The particular signal or signals superimposed upon directed beam portion 100 as provided by signal source 102 and due to interposition of semiconductor 101 in the path of beam 100 will result in the intelligence being carried by the laser beam and propagated in the form of modulated carrier 105.

We claim:

1. A laser device for developing an extracavity laser beam, said device comprising:
    a resonant laser cavity having an axis and a gaseous medium in at least a portion of said cavity along said axis,
    first means for exciting said medium to cause the production of intracavity laser power in a group of frequency bands
    reacting means interposed inthe path of the intracavity laser power for selectively tuning the resonant laser cavity to at least one of said frequency bands, said reacting means comprising electrically responsive transducer means and dispersive means coupled to said electrically responsive transducer means, said dispersive and transducer means being located within said resonant laser cavity for providing the selective tuning of said laser cavity in accordance with the application of a selected one of a plurality of frequencies of electrical signals to said transducer means.

2. The laser device of claim 1 wherein:
    said transducer means is comprised of a piezoelectric material.

3. The laser device of claim 1 further including:
    third means coupled to said transducer means for selectively applying one of the plurality of frequencies of electrical signals to said transducer means to selectively tune said laser cavity to an associated one of the frequency bands.

4. The laser device of claim 1 further including:
    fourth and fifth means respectively positioned at opposite ends of said first means for providing reflection of the intracavity laser power for enabling the laser device to produce a plurality of modes of oscillation.

5. The laser device of claim 1 further including:
    a signal source for providing a plurality of said electrical signals; and
    a programmer coupled to said signal source for selectively providing any of the electrical signals to said transducer means.

6. The laser device of claim 1 wherein said dispersive means comprises means positioned on said axis within said resonant laser cavity for selectively deflecting the intracavity laser power in accordance with the frequency of electrical signal energizing said transducer means.

7. The laser device of claim 6 wherein said dispersive means is positioned to pass a portion of the intracavity laser power out of said resonant cavity as the extracavity laser beam.

8. A laser device for producing extracavity laser beam, said device comprising:
    first means including a resonant laser cavity having an axis and a gaseous medium in at least a portion of said cavity along said axis;
    second means for exciting said medium to cause the production of intracavity laser power within said cavity at a group of frequency bands;
    tuning means for causing intracavity laser power to resonate within said resonant laser cavity at a selected one of said frequency bands, said tuning means comprising dispersive means positioned on said axis within said resonant laser cavity for selectively deflecting intracavity laser power relative to said axis by an amount related to the selected frequency of said intracavity laser power, said dispersive device including a Bragg acoustic reflection device having an electrical to acoustic transducer; and third means external to said cavity for controlling said dispersive means by electrically exciting said transducer at a selected frequency so as to select the frequency of the intracavity power that resonates within said cavity.

9. A laser device comprising:

an optical resonant laser cavity having an optical axis and a member containing a gaseous laser medium in at least a portion of the cavity along said axis;

means for exciting said medium for producing intracavity laser power containing photons within said cavity;

reacting means disposed within said resonant laser cavity and optically coupled to said member for reacting with the intracavity laser power for causing the intracavity laser power to resonate at a desired one of a plurality of frequency bands, said reacting means comprising means interposed in said resonant cavity on said optical axis for achieving Bragg acoustic reflection, transducer means for acoustically exciting said means for achieving Bragg acoustic reflection, and means for exciting said transducer means with a selected one of a plurality of frequencies, said transducer means and said means for achieving Bragg acoustic reflection cooperating together to deflect photons relative to the optical axis of said resonant laser cavity in order to cause the deflected photons to resonate in said cavity at a selected one of the frequency bands as a function of the selected frequency exciting said transducer means.

10. The laser device of claim 9 including means for selectively tuning said laser cavity comprising means for selectively varying the frequency of excitation of said transducer means to selectively vary the frequency band of the intracavity laser power resonant within said cavity.

11. The laser device of claim 9 wherein said means for achieving Bragg acoustic reflection is positioned to direct at least a portion of the intracavity laser power within the cavity to and along a path external to said cavity.

12. The laser device of claim 11 wherein said resonant laser cavity forms a continuous closed loop to provide a ring-laser having two oppositely directed modes of propagation of energy resonant therein.

* * * * *